United States Patent [19]

Guichard et al.

[11] Patent Number: 5,357,870
[45] Date of Patent: Oct. 25, 1994

[54] ARTICULATED, ORIENTABLE AUDIOVISUAL TELECOMMUNICATION TERMINAL

[75] Inventors: Jacques Guichard; Georges Buchner, both of Paris; Alain Isckia, Vitry/Seine, all of France

[73] Assignee: France Telecom, France

[21] Appl. No.: 30,005

[22] PCT Filed: Jul. 15, 1992

[86] PCT No.: PCT/FR92/00681
  § 371 Date: Apr. 12, 1993
  § 102(e) Date: Apr. 12, 1993

[87] PCT Pub. No.: WO93/02530
  PCT Pub. Date: Feb. 4, 1993

[30] Foreign Application Priority Data
  Jul. 16, 1991 [FR] France ............... 91 08959

[51] Int. Cl.⁵ .............................. A47F 5/12
[52] U.S. Cl. .............................. 108/2; 108/7; 108/20
[58] Field of Search ............ 108/2, 6, 7, 20, 23, 108/50; 379/53, 4

[56] References Cited

U.S. PATENT DOCUMENTS

| 3,267,878 | 8/1966 | Faux et al. | 108/2 |
| 3,359,927 | 12/1967 | Janus | 108/2 |
| 3,903,812 | 9/1975 | Cowley | 108/2 |
| 4,856,045 | 8/1989 | Hoshina . | |

FOREIGN PATENT DOCUMENTS

| 0499632 | 4/1948 | Canada | 108/2 |
| 2151800 | 4/1973 | Fed. Rep. of Germany . | |
| 3309685 | 9/1984 | Fed. Rep. of Germany . | |
| 2075114 | 11/1981 | United Kingdom . | |

Primary Examiner—James R. Brittain
Assistant Examiner—Gerald Anderson
Attorney, Agent, or Firm—Pearne, Gordon, McCoy & Granger

[57] ABSTRACT

The audiovisual telecommunication terminal makes it possible to orient the flat screen relative to the position of the face of the operator in front of the same. The terminal comprises means for the flexible driving of the mobile part (20) carrying the flat screen relative to the fixed part (10). The transmission is of the "pulley block" type and uses a motor (12) driving a belt (8) fixed on the one hand to a drive shaft (18) and on the other to the fixed part (10) in order to exert tension on the mobile part (20). The reverse movement can be brought about by helical springs (19).

7 Claims, 2 Drawing Sheets

ARTICULATED, ORIENTABLE AUDIOVISUAL TELECOMMUNICATION TERMINAL

DESCRIPTION

FIELD OF THE INVENTION

The present invention relates in general terms to the field of audiovisual telecommunications and more particularly to arrangements for increasing use comfort provided on audiovisual communication terminals, e.g. picturephones or videophones. Such an apparatus or terminal enables the speaker to communicate by sound and picture and via a telecommunications network with another remote speaker equipped with an identical apparatus or terminal.

PRIOR ART AND SET PROBLEM

An audiovisual telecommunication terminal conventionally comprises a camera, a display screen, a loudspeaker, a mouthpiece, an electronic encoding/decoding control unit and serving as an interface with a transmission line, together with either manual or automatic checking or inspection means. All these equipments are located in a box or case usually intended to be placed on a table in front of the seated speaker.

In known audiovisual telecommunication terminals, the camera aiming direction is generally fixed. Therefore, to enable the operator to move to a certain extent within the field of the camera without his opposite number losing his picture, the shooting angle must be relatively wide. As a result the remote speaker terminal screen restores an image or picture on which the first speaker occupies a relatively small space. In other words, he is shown on small scale and appears to be a long way away. This disadvantage is not compensated by the fact that audiovisual telecommunication terminals generally have small dimensions.

It has also been found that it would be of great interest for an operator or speaker to be seen in close up by his remote counterpart. Therefore attempts have been made to use a reduced shooting angle and a longer focal length. However, the observed operator has a tendency to pass too rapidly out of the field of the camera.

Attempts have already been made to obviate these disadvantages by proposing several audiovisual telecommunication terminal systems in which part of the apparatus is motorized so that certain of the elements, namely the camera and the screen can be tilted as a function of the position of the operator in front of the same with a view to placing him under better viewing and shooting conditions.

Thus, e.g. French patent 2 642 928 discloses an audiovisual telecommunication terminal, whereof the part carrying the screen and the camera is mounted so as to move with respect to the other part. Motorization means are provided for pivoting said part as a function of the operator position. However, this system suffers from weaknesses because the raising and lowering system for said mobile part is not perfectly reversible. This has the consequence that on exerting an opposing force on the motor mechanism of terminal, or when the movement is forced when the motor is in the inoperative state, the coupling system used for coupling the motor may be damaged. In addition, the coupling system is not very reliable over a period of time, because it is necessary to perfectly meter the frictional forces. Moreover, as the motor is located in the rotation axis of the fixed part, it is subject to irregular stresses and forces, which are dependent on the opening angle of the two parts. Thus, the torque resisting the rotation is in particular created by the weight of the mobile equipments. These forces make it necessary to use a relatively high power motor, whose gears are noisy and also an overdimensioned reduction gear, in order to achieve a sufficiently slow rotation speed. The object of the invention is to obviate these disadvantages in order to make it possible to reversibly and relatively discreetly tilt the mobile part of the terminal comprising the video equipment, so that it can assume the most appropriate spatial position for the user.

SUMMARY OF THE INVENTION

To this end, the main object of the invention is an audiovisual telecommunication terminal which is articulated and orientable and which comprises a fixed part, a mobile part, articulated with respect to the fixed part along a horizontal axis and which is to be placed facing the user and having display means, shooting means, sound recording means and sound restoration means, electronic encoding/decoding control means serving as an interface with a transmission line placed in one of the two parts and motor means for pivoting the mobile part relative to the fixed part.

According to the invention, the motor means comprise a motor mounted on one of the two parts in order to actuate at least one "pulley block"-type transmission system in order to angularly move the fixed part towards the mobile part.

The term "pulley block" is understood to mean any system using a cord, as well as a deflecting pulley for displacing a charge by reducing the necessary lifting force.

This use of a pulley block is advantageously completed by the use of at least one helical spring mounted around the horizontal axis and in order to angularly move apart the mobile part and the fixed part.

It is preferable to place the motor on the fixed part in order to relieve the mobile part. The motor is advantageously completed by a worm reduction gear for transmitting the movement.

Preferably, the pulley block system comprises a first pulley driven by the motor about which is fixed and wound the first end of a belt and a second pulley which is able to freely rotate on the mobile part and around which is deflected the belt, the second end of the belt being fixed to the fixed part.

It is advantageous to use a ratchet system mounted on the drive shaft and downstream of the worm and on which is mounted the first pulley, so as to prevent the belt from unwinding when the motor inoperative. The belt is preferably made from a metallic material permitting a constant force winding.

LIST OF DRAWINGS

The invention is described in greater detail hereinafter relative to non-limitative embodiments and with reference to the attached drawings, wherein show:

FIG. 1 A perspective rear view of a first embodiment of the motor means of the audiovisual telecommunication terminal according to the invention.

FIG. 2 A perspective rear view of a picturephone with the second embodiment of the motor means.

DETAILED DESCRIPTION OF TWO EMBODIMENTS OF THE INVENTION

Figure 1:
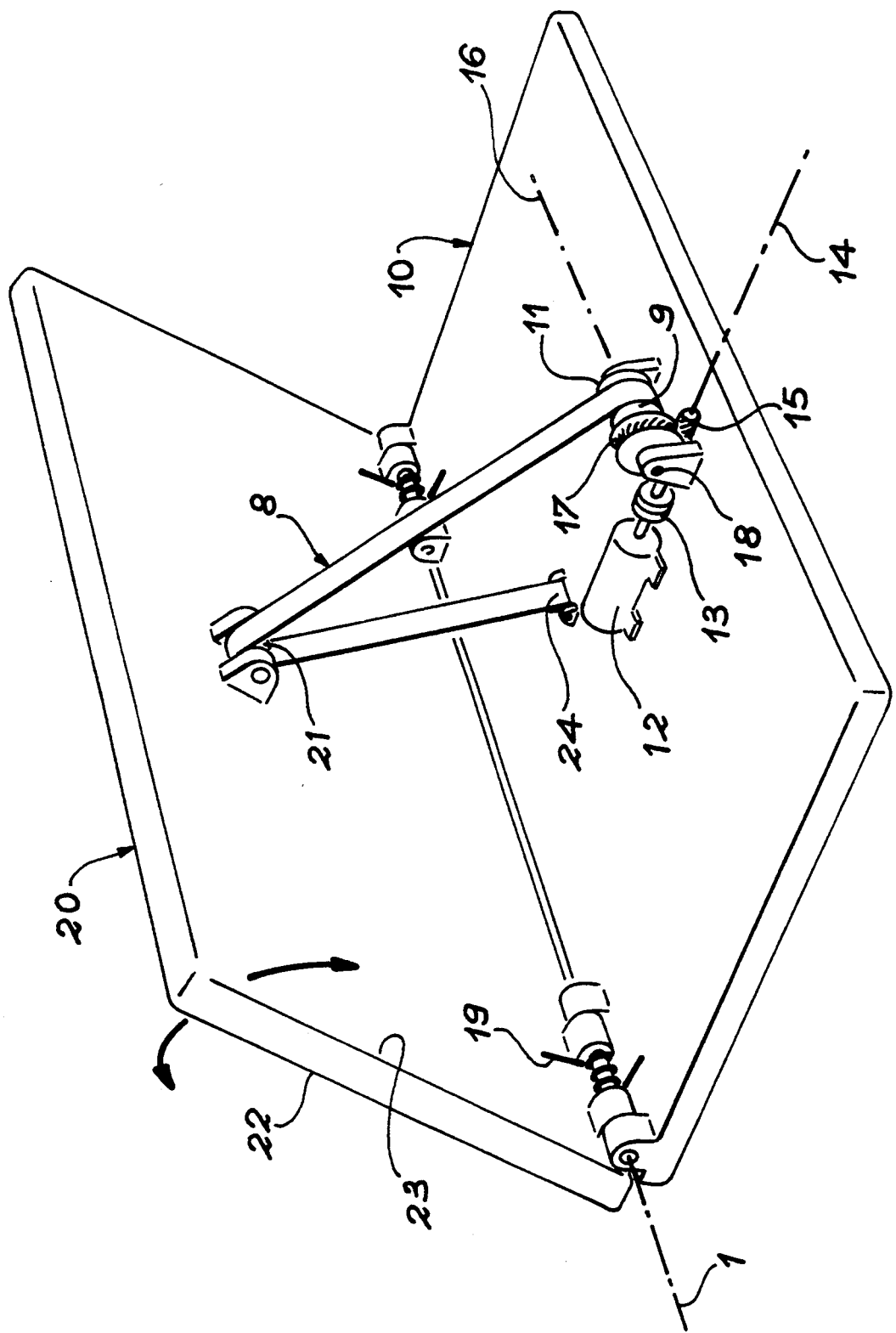

With reference to FIG. 1, the audiovisual telecommunication terminal according to the invention is shown in perspective and in rear view in an open position. When inoperative, the terminal must appear like a relatively flat telephone, or at least an object having small overall dimensions. When the user requires a call, the structure of the terminal must be appropriate for opening out so as to give the final appearance of an audiovisual equipment having display means, e.g. a display screen and, if necessary, shooting means such as a camera in front of the operator or user.

Thus, the audiovisual telecommunication terminal comprises two main parts, namely a fixed part 10 placed flat on a support such as a desk or table and a mobile part 20. The latter is mounted so as to pivot about a horizontal axis 1 integral with the fixed part. The motor means used in the audiovisual telecommunication terminal according to the invention occupy the variable space between the fixed part 10 and the mobile part 20, because said space is not functionally used from the standpoint of the electronic equipments. Thus, the elements necessary for this transmission, i.e. the shooting, recording, display and sound restoration means and specifically a mouthpiece, a camera, a display screen and a loudspeaker, are placed on the front face 22 of the mobile part 20. This front face 22 is oriented so as to be in front of the face of the operator. Therefore the rear face 28 of the mobile part 20 is free.

The motor means are actuated by a motor 12, preferably placed on the fixed part 10. Use is e.g. made of a small direct current motor. The output shaft of the motor 12 is fixed to a flexible coupling 13 facilitating the fitting of the motor 12 on the one hand and the remainder of the transmission members on the other.

The transmission system used according to the invention is of the pulley block type. Thus, a belt 8 is used as the transmission means between the fixed part 10 and the mobile part 20 of the terminal. A first end of the belt 8 is wound around a first pulley 11 integral with a drive shaft 18 rotated by the motor 12 by means of the flexible coupling 13. The arrangement shown in FIG. 1 provides an angle return between the motor 12 and the drive shaft 18. This arrangement is only an exemplified embodiment and other transmission systems can be used. For bringing about this angle return, a worm or endless screw 15 is fixed to the flexible coupling and meshes with a toothed wheel 17 integral with the drive shaft 18. The worm 15 also serves as a reduction gear cooperating with the toothed wheel 17.

The belt 8 is also carried by a deflecting pulley 21, mounted so as to rotate freely on the mobile part 20, its axis being parallel to the axis 16 of the first pulley 11 and the drive shaft 18. The second end 24 of the belt 8 is fixed to the fixed part 10.

At least one and preferably two helical springs 19 are mounted relative to the horizontal pivoting axis 1. Each torsion spring 19 has one end integral with the fixed part 10 and the other end integral with the mobile part 20. Thus, as shown in FIG. 1, it is possible to exert a rotary force on the mobile part 20 opposing the force exerted by the motor means. Therefore the mobile part 20 can be brought into a folded back position relative to the fixed part 10. The helical springs 19 make it possible to move the mobile part 20 away from the fixed part 10. Therefore to the mobile part 20 is applied by the said springs a constant opening force, no matter what the angular displacement of said mobile part 20.

The force necessary for the motor 12 in order to keep opened out the mobile part 20, or fold back the latter is relatively limited as a result of the pulley block-type system, which in the simplest case divides by two the force which is required as a result of its design. The belt 8 serves as a reduction gear and also reduces the tilting speed of the mobile part 20.

It is very advantageous to use as the belt 8 a metal tape of the constant force winding type, such as is used in flexible metal tape measures, which are extended with a limited, but always identical force, no matter what length is drawn out. Such a metal tape makes it possible to ensure that a fabric belt does not assume a relaxed position during winding up i.e. the closing of the mobile part 20 on the fixed part 10. Thus, as soon as the operator bears on the mobile part 20, the belt 8 is no longer under tension and is automatically rewound.

To ensure that the belt 8 does not unwind when the motor 12 is inoperative, it is advantageous to place a ratchet system 9 between the drive shaft 18 and the first pulley 11.

The motor 12 can be electrically under-supplied to reduce its speed. It also does not require a high power level, hence its small size and overall dimensions. It can be advantageously electronically power regulated, in order to control its speed and limit its oversupply in the blocked state.

Figure 2:
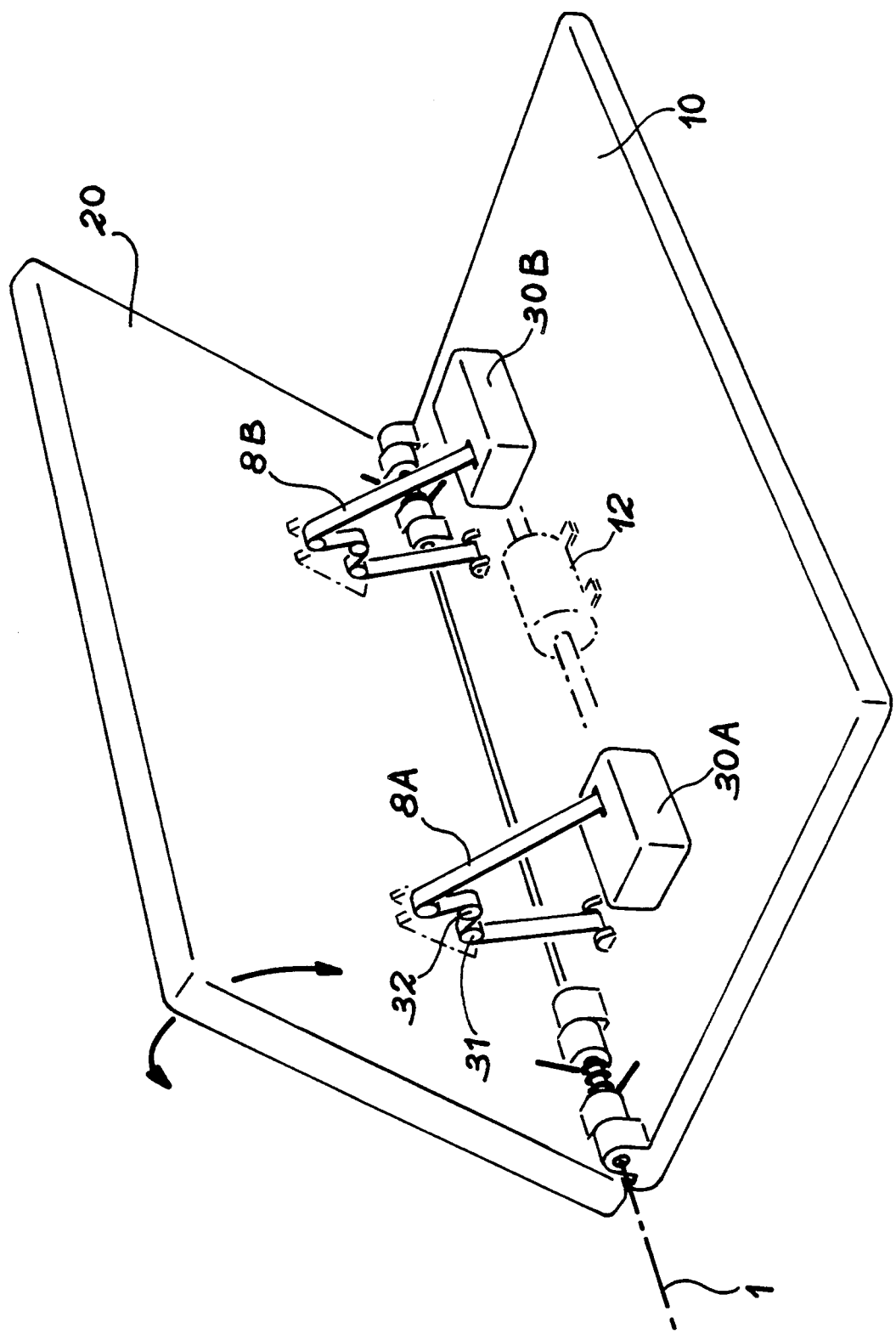

With reference to FIG. 2, by subdividing the motor means into two parts at the outlet of the motor 12, it is possible to reduce their overall dimensions in the opening between the fixed 10 and mobile 20 parts. Thus, by coupling the output shaft of a single motor 12 two transmission systems 30A, 30B, each having the elements described hereinbefore, it is possible to use two pulley block systems, each having a belt 8A, 8B.

FIG. 2 shows in each transmission system two supplementary pulleys 31, 32 symbolizing the complementary elements of a pulley block system using three pulleys, including two supplementary pulleys 31, 32 on the mobile part 20, unlike the single pulley 21 in FIG. 1. This is only shown in order to illustrate the possibility of using different types of pulley block reduction systems.

On moving towards the pivoting axis 1, the return torque of the motor 12 is reduced and is compensated by the advantageous use of two pulley block systems. It is also possible to use two small motors on the fixed part 10 and one being used for each two pulley block systems.

The operator or speaker in front of this type of terminal can easily orient the mobile part 20 as a function of the position of his face. Thus, on such an audiovisual telecommunication terminal, it is advantageous to instal a flat liquid crystal screen, which has a restricted visibility cone of approximately 30° in the direction of a vertical plane and 60° in the horizontal direction. Therefore the eye of the observer must be located in the preferred observation direction, which is not the direction normal to the front face 22 of the mobile part 20. In addition, the operator moves during the picturephone conversation. When using the audiovisual telecommunication terminal according to the invention, it is therefore possible to move the mobile part 20 during the action and this takes place in a continuous manner without jerking, so as not to disturb the shooting operation carried out by the camera. It is possible to use for this purpose a tracking control system with respect to the position of the operator's face.

The motor system used in the audiovisual telecommunication terminal according to the invention is very quiet, which is advantageous bearing in mind the fact that the mouthpiece or mouthpieces are located on the front face 22 of the mobile part 20. This obviates excessive coupling between the loudspeaker and the mouthpiece or mouthpieces placed on said front face 22 of the mobile part 20.

The motor means of the system according to the invention are reversible, i.e. it is possible to fold back the mobile part 20 with a minimum force or open it by pulling and without having to force it. For this purpose there is a possibility of reversing the direction of the ratchet.

We claim:

1. Audiovisual telecommunication terminal which is articulated and orientable and which comprises a fixed part (10), a mobile part (20), articulated with respect to the fixed part (10) along a horizontal axis (1) and which is to be placed facing a user and have display means, shooting means, sound recording means and sound restoration means, electronic encoding/decoding control means serving as an interface with a transmission line placed in one of the two parts (10, 20) and motor means (12) for pivoting the mobile part (20) relative to the fixed part, characterized in that the motor means comprise a motor (12) mounted on one of the two parts (10, 20) in order to actuate at least one pulley block-type transmission system in order to angularly move the fixed part (10) towards the mobile part (20).

2. Audiovisual telecommunication terminal according to claim 1, characterized in that the motor (12) is placed on the fixed part (10).

3. Audiovisual telecommunication terminal according to claim 1 or 2, characterized by at least one helical spring (19) the horizontal axis (1) in order to angularly move the mobile part (20) away from the fixed part (10).

4. Audiovisual telecommunication terminal according to claim 1 or 2, characterized in that includes a worm reduction gear (15, 17).

5. Audiovisual telecommunication terminal according to claim 4, characterized in that the worm reduction system (15, 17) is placed between the motor (12) and a first pulley (11) driven by the motor (12) and around which is fixed and wound a first end of a belt (8) and a second pulley (21) mounted so as to freely rotate on the mobile part (20) and about which is deflected the belt (8), the second end (24) of said belt (8) being mounted in fixed manner on the fixed part (10).

6. Audiovisual telecommunication terminal according to claim S, characterized in that includes a ratchet device (9) integral with the drive shaft (16) and on which is mounted the first pulley (11).

7. Audiovisual telecommunication terminal according to claim 5 or 6, characterized in that the belt (8) is metallic and of the constant winding type.

* * * * *

UNITED STATES PATENT AND TRADEMARK OFFICE
CERTIFICATE OF CORRECTION

PATENT NO. : 5,357,870
DATED : October 25, 1994
INVENTOR(S) : Guichard et al.

It is certified that error appears in the above-identified patent and that said Letters Patent is hereby corrected as shown below:

Column 1, line 61, after "of" insert --the--.

Column 2, line 55, after "motor" insert --is--.

Column 3, line 31, delete "28" and insert --23--.

Column 6, line 24, (Claim 6, line 2), delete "claim S" and insert --Claim 5--.

Signed and Sealed this

Seventh Day of March, 1995

Attest:

BRUCE LEHMAN

Attesting Officer

Commissioner of Patents and Trademarks